United States Patent
Kampman

(10) Patent No.: US 9,167,755 B1
(45) Date of Patent: Oct. 27, 2015

(54) TRELLIS SUPPORT DEVICE

(71) Applicant: Brian Kampman, Springfield, OH (US)

(72) Inventor: Brian Kampman, Springfield, OH (US)

( * ) Notice: Subject to any disclaimer, the term of this patent is extended or adjusted under 35 U.S.C. 154(b) by 177 days.

(21) Appl. No.: 13/928,436

(22) Filed: Jun. 27, 2013

Related U.S. Application Data

(60) Provisional application No. 61/666,327, filed on Jun. 29, 2012, provisional application No. 61/676,670, filed on Jul. 27, 2012.

(51) Int. Cl.
*A01G 17/06* (2006.01)

(52) U.S. Cl.
CPC ...................................... *A01G 17/06* (2013.01)

(58) Field of Classification Search
CPC ......... A01G 9/12; A01G 17/06; A01G 9/122; A01G 9/124; A01G 17/04; A01G 17/14; A01G 13/02; A01G 13/0243; D06F 53/04
See application file for complete search history.

(56) References Cited

U.S. PATENT DOCUMENTS

| | | | | |
|---|---|---|---|---|
| 349,086 | A * | 9/1886 | Cole | 47/32.4 |
| 2,763,096 | A * | 9/1956 | Roger | 47/45 |
| 3,041,783 | A * | 7/1962 | Pezdek et al. | 47/44 |
| 3,299,569 | A * | 1/1967 | Lemrick | 47/45 |
| 4,005,548 | A * | 2/1977 | Nahon | 47/45 |
| 4,213,272 | A * | 7/1980 | Nievelt | 47/45 |
| 5,174,060 | A * | 12/1992 | Glamos | 47/45 |
| 5,179,799 | A * | 1/1993 | Hillestad | 47/45 |
| 5,323,559 | A * | 6/1994 | Allman | 47/45 |
| 5,640,802 | A * | 6/1997 | Elliott | 47/45 |
| 6,385,901 | B1 * | 5/2002 | Wahlberg | 47/45 |
| 7,874,100 | B2 * | 1/2011 | Miller | 47/46 |
| 8,006,433 | B1 * | 8/2011 | Bryanton | 47/45 |
| 8,935,879 | B1 * | 1/2015 | Falk | 47/45 |
| 2003/0132362 | A1 * | 7/2003 | Miller | 248/530 |
| 2005/0039394 | A1 * | 2/2005 | Kelly | 47/45 |
| 2005/0144839 | A1 * | 7/2005 | Morgan et al. | 47/45 |
| 2008/0028677 | A1 * | 2/2008 | Shelton | 47/46 |
| 2008/0256856 | A1 * | 10/2008 | Rosaen | 47/45 |
| 2011/0308151 | A1 * | 12/2011 | Wu | 47/46 |
| 2012/0204488 | A1 * | 8/2012 | Anderson | 47/66.6 |

FOREIGN PATENT DOCUMENTS

| | | | | |
|---|---|---|---|---|
| DE | 4031243 | C1 * | 9/1991 | ............... A01G 9/12 |
| GB | 374634 | * | 6/1932 | ............... A01G 9/12 |
| GB | 2115262 | A * | 9/1983 | ............. A01G 13/00 |

OTHER PUBLICATIONS

Machine translation of DE 4031243 to Meyer, published Sep. 1991.*

* cited by examiner

*Primary Examiner* — Kathleen Alker
(74) *Attorney, Agent, or Firm* — James R. Eley; Claire Patton; Eley Law Firm Co, LPA

(57) ABSTRACT

A trellis support device includes first and second subassemblies, and each subassembly having one or more elongate support members joining together a plurality of ring portions. The ring portions are configured to align and connect together adjacent first and second subassemblies. The first and second subassemblies are configured to engage an underlying support material and to provide a structurally supported growth area for plants.

17 Claims, 3 Drawing Sheets

TRELLIS SUPPORT DEVICE

CROSS-REFERENCE TO RELATED APPLICATIONS

This application claims priority to U.S. provisional application 61/666,327, filed Jun. 29, 2012, and U.S. provisional application 61/676,670, filed Jul. 27, 2012, the entire contents of each application being incorporated by reference.

FIELD

The present invention relates generally to trellis support devices, and in particular to a trellis support configured to assemble around objects such as posts to form a structurally supported growth area for plants.

BACKGROUND

A trellis is a structure, often made from interwoven pieces of wood, bamboo, plastic or metal that is made to support climbing plants and vines. Trellises are typically generally planar, fence-like structures. As a result, they can also be used as a decorative fence or border for gardens, sidewalks, landscaping, and so on.

Trellises typically comprise latticework or other supporting structure that is attached to a frame. The frame serves to support the latticework and usually also includes a mounting portion that is placed partially into the ground in order to hold the trellis in place at a desired installation location.

It is often desirable to place climbing plants and vines around upwardly-projecting objects such as ground-mounted lamp posts, other lawn and garden posts, poles, decorations, scarecrows, or plant stalks in order to achieve a desired aesthetic effect. Additionally, in gardening, it is often desirable to add structural support to unstable growing plants to support heavy vegetation, blooming flowers, fruits, or vegetables, such as for peonies or tomato plants. Various plants have large, heavy blooms where the weight of the flower needs to be supported above the ground, and various plants can produce heavy fruits or vegetables which benefit from support above the ground. It is often desirable to support the plant stalks and blooms or fruit to protect them from damage due to insects, dirt or from contact with the ground. It is also beneficial to support the blooms or fruit up higher off the ground so they are more visible. However, generally planar trellises are not readily adaptable for such purposes. Known circular plant supports tend to be made of thin, light-weight, one-piece wire construction and cannot be easily installed once the plant is large and starting to set flower buds. Yet, the placement of a large sized convention wire support over a young plant detracts from the natural aesthetic appeal of the lawn or garden. Also, known supports of one-piece construction cannot be disassembled for easy, compact storage, and cannot accommodate posts with large headpieces, such as a mailbox or bird feeder. Furthermore, a lamp post usually provides little in the way of support for climbing plants and vines. There is a need for a way to provide a knockdown support for unstable plants generally, and for climbing plants and vines freestanding or planted around vertical posts and other similar structures.

SUMMARY

A trellis support device is disclosed according to an embodiment of the present invention. The trellis support device includes first and second subassemblies configured to surround and partially enclose an object such as a post, or an unstable plant. The first and second subassemblies are arranged on opposing sides of the object and are then joined together to generally surround the object. Mounting legs of the subassemblies are urged into a supporting material, such as soil, thereby retaining the trellis support device in a desired generally vertical position. The trellis may be used to form a structurally supported growth area for unstable or climbing plants and vines.

In one embodiment of the present invention a trellis support device includes a first and second subassembly, and each subassembly having one or more elongate support members joining together a plurality of ring portions. The ring portions are configured to align and connect together adjacent first and second subassemblies. The first and second subassemblies are configured to engage an underlying support material and to provide a structurally supported growth area for plants.

In one embodiment of the present invention a method of assembling a trellis support device for growing plants includes the step of providing a trellis support device including at least two mating subassemblies, and each subassembly having one or more elongate support members joining together a plurality of ring portions. A further step includes disposing the mating subassemblies on opposing sides of an object. A further step includes aligning and connecting together adjacent ring portions of the mating subassemblies to substantially surround the object. A further step includes urging the trellis support device into an underlying support material such that the mating subassemblies engage the underlying support material and provide a structurally supported growth area for plants.

BRIEF DESCRIPTION OF THE DRAWINGS

Further features of the inventive embodiments will become apparent to those skilled in the art to which the embodiments relate from reading the specification and claims with reference to the accompanying drawings, in which:

FIG. 4 is an enlarged view of a portion of FIG. 2, showing details of a mounting portion of the trellis support device.

DETAILED DESCRIPTION

Figure 1:
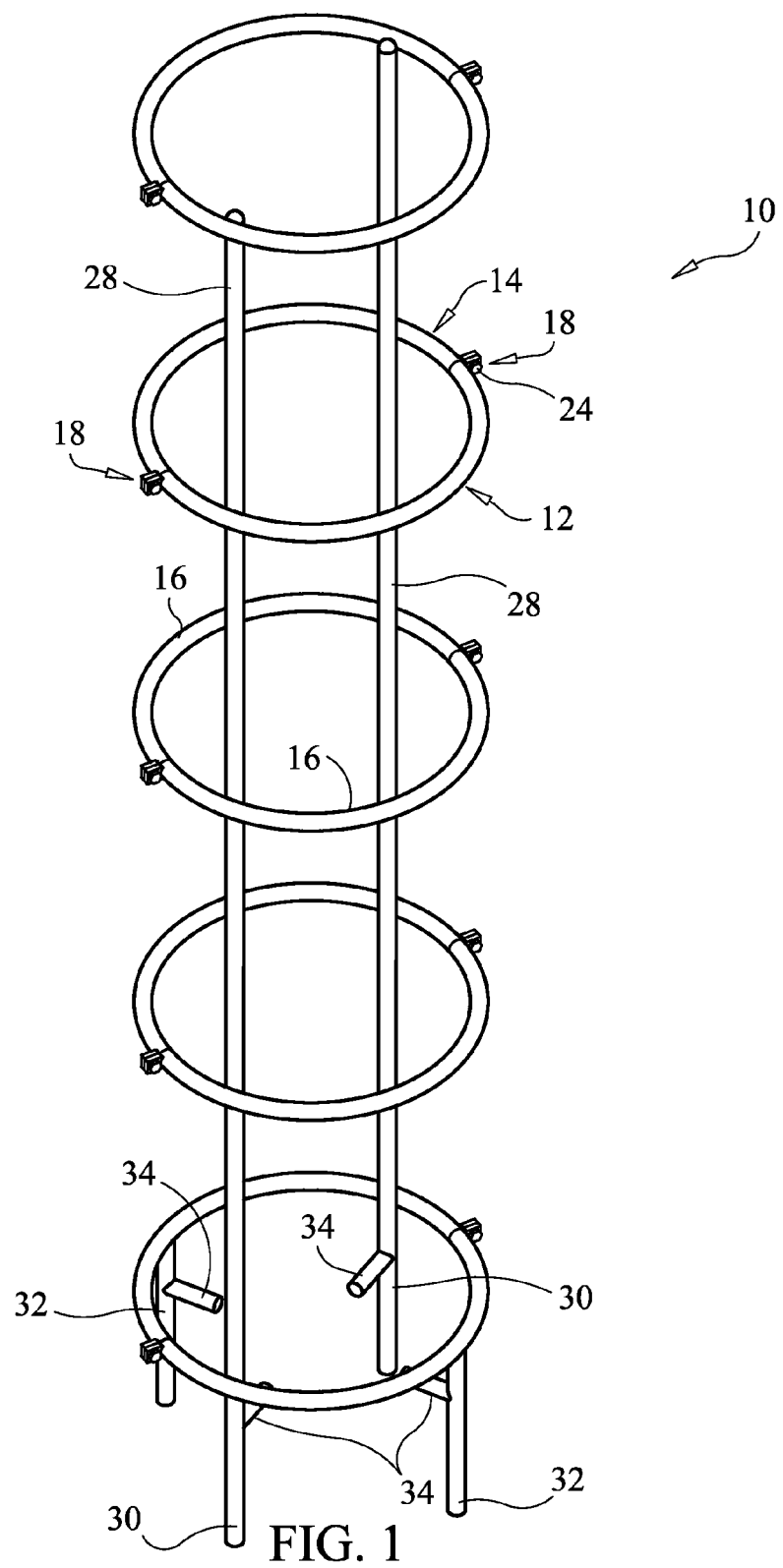
FIG. 1 is a perspective view of a trellis support device according to an embodiment of the present invention.

In the discussion that follows, like reference numerals are used to refer to like elements and structures in the various figures.

Figure 2:
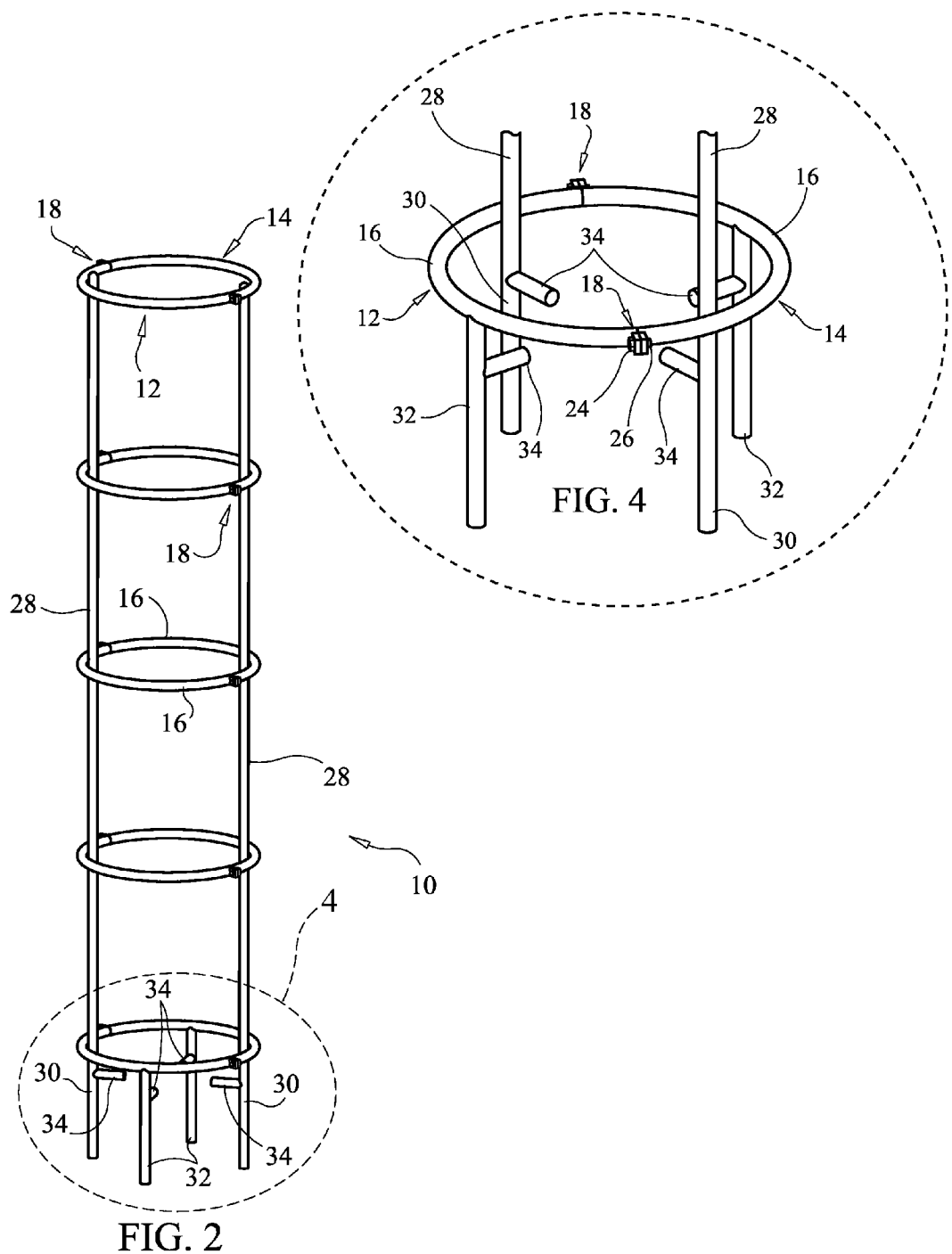
FIG. 2 is another perspective view of the trellis support device of FIG. 1.
Figure 3:
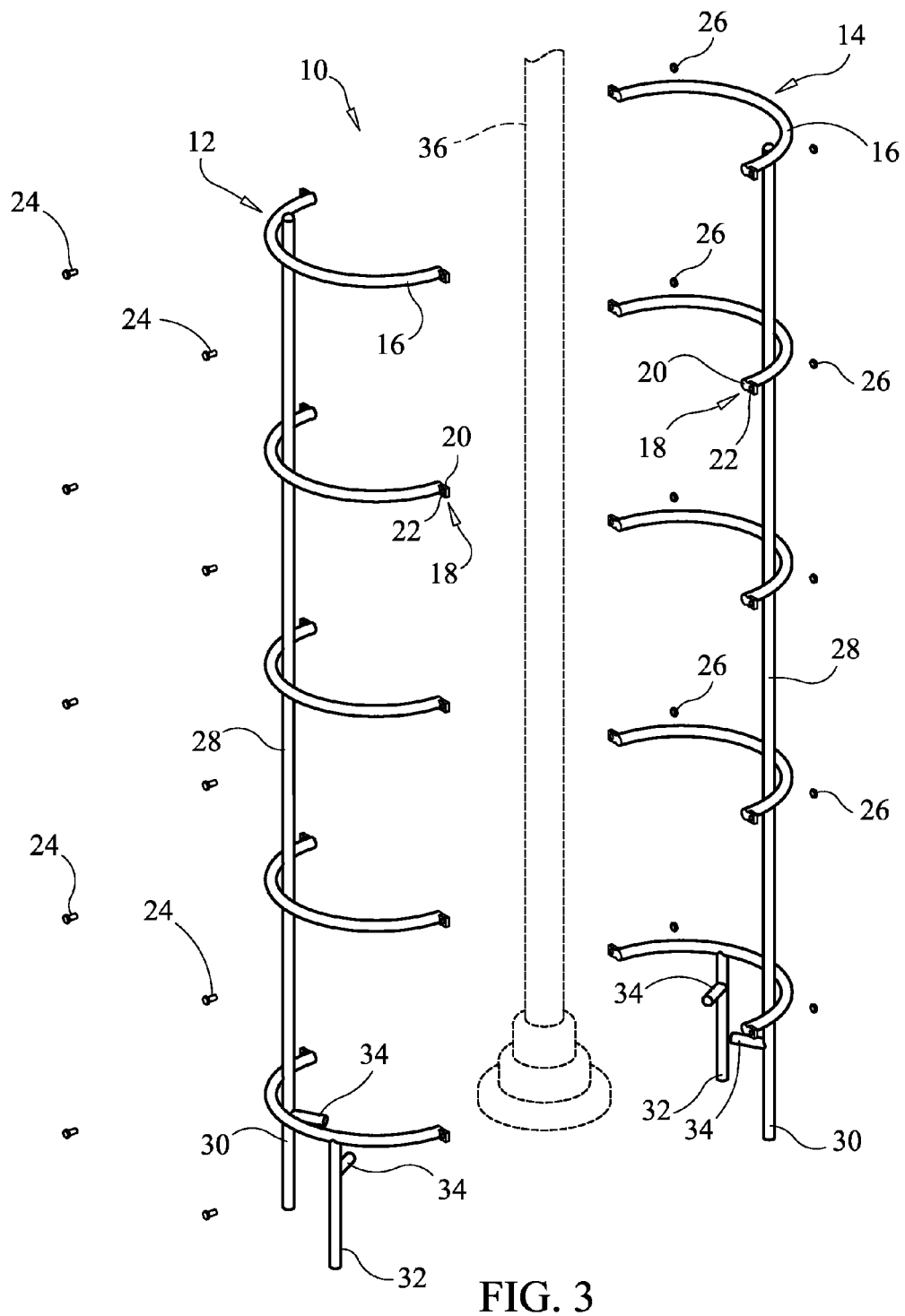
FIG. 3 is an exploded view showing details of the components of the trellis support device of FIG. 1.

A trellis support device 10 (hereafter "trellis 10") is shown in FIGS. 1 through 3 according to an embodiment of the present invention. Trellis 10 comprises a first and a second subassembly 12, 14 respectively, which are configured for removable attachment together. The first and second subassemblies 12, 14 are also configured to engage an underlying support material, such as soil (not shown) to removably secure the trellis 10 in a predetermined position. In some embodiments of the present invention subassemblies 12, 14 are generally identical or are mirror images of each other. The first and second subassemblies 12, 14 are configured to substantially surround an object such as a post 36 (see FIG. 3), or the central portion of an unstable plant to form a generally cylindrical structurally supported growth area for plants. In one embodiment, the plants (not shown) are positioned adjacent the exterior of the trellis 10, and as the plants grow, they climb and extend upward against the exterior of the trellis. Although a first and a second subassembly 12, 14 are shown, further mating subassemblies may be used to assemble the trellis 10, such as a third or fourth subassembly.

Each of first and second subassemblies 12, 14 include a plurality of ring portions 16 configured to align and connect together when the first and second subassemblies are joined together. In the embodiment of FIG. 1 ring portions 16 are generally shown as circular or "half-circles." However, ring portions 16 may be or include any geometric shape within the scope of the invention including, without limitation, arc, oval, straight, square, rectangular and polygonal shapes, or combinations thereof. In an alternate embodiment, the ring portions 16 on each subassembly 12, 14 may be of different geometric shapes or lengths. In a further alternative embodiment, the ring portions 16 may include extensions, or telescoping portions that provide a width or diameter adjustment to increase or decrease the perimeter of the growth area available. In one embodiment, the diameter of the growth area available from assembled ring portions 16 is about 14 inches diameter, from about 8 inches to about 24 inches, from about 12 inches to about 20 inches, or from about 12 inches to about 16 inches.

Each of ring portions 16 may include one or more connectors 18 configured to couple together first and second subassemblies 12, 14. In one embodiment of the present invention connectors 18 include lugs 20 having an aperture 22 through which mounting hardware such as threaded screws or bolts 24 and threaded nuts 26 are used to join together the first and second subassemblies 12, 14. Alternatively, connectors 18 may be any suitable type of connecting or joining device or devices including, without limitation, threaded apertures 22, threaded inserts, snaps, snap rings, cable ties, hook and loop type fasteners, wire, clips, clamps and string or rope. In an alternative embodiment, the connectors 18 may be integral with the ring portions 16, and may include end sections of the ring portions configured to connect by overlapping friction fit, detent, quick disconnect, or be made interlocking without additional hardware. The connectors 18 may be made capable of multiple cycles of assembly and disassembly to provide for storage and reuse of the trellis 10.

In some embodiments at least some connectors 18 may include hinge elements to allow first and second subassemblies 12, 14 to be hingedly joined together. In an alternative embodiment, the first and second subassemblies 12, 14 may be rotatably joined by one or more elongated hinge assemblies extending vertically between and connecting to ring portions 16. In a further embodiment, at least some connectors 18 may include a flexible joint or tubing connecting adjacent ring portions 16 of the first and second subassemblies 12, 14.

Each of first and second subassemblies 12, 14 may include one or more elongate support members 28. In one embodiment, a first support member 28 extends between ring portions 16 of first subassembly 12, joining together the ring portions of the first subassembly. Likewise, a second support member 28 extends between ring portions 16 of second subassembly 14, joining together the ring portions of the second subassembly. In one embodiment, a first support member 28 connects to and extends from a series of five equally spaced and generally parallel ring portions 16. Although first and second support members 28 are shown as connecting to the interior side of the ring portions 16, the first and second support members may connect to any side of or location within the ring portions. The first and second support members 28 may include multiple segments connecting vertically between the ring portions 16, or may be made integral with the ring portions. In one embodiment, the height of the growth area available from assembled trellis 10 is about 4 feet, from about 2 feet to about 12 feet, from about 3 feet to about 10 feet, or from about 4 feet to about 8 feet.

Although ring portions 16 are shown as substantially the same length and radius, and as connecting substantially orthogonally to the generally parallel elongate support members 28, alternatively, the ring portions 16 may connect at an angle, and the elongate support members may be disposed at an angle relative to the underlying support material. In a further alternative embodiment, the elongate support members 28 may include extensions, or telescoping portions that provide length adjustment to increase or decrease the growth area height available. In another embodiment, the trellis 10 is configured to stack and attach multiple trellis together vertically to increase the height of growth area available.

In some embodiments the trellis 10 may include lattice, screen or mesh material attached to provide additional support to the unstable or climbing plants. In a further alternative embodiment, the trellis 10 may include one or more adjustable anchor devices such as a cord loop for engagement with the post or the main stalk of the unstable plant.

With reference to FIG. 4, a lower portion of support members 28 may be configured as mounting legs 30. Ancillary mounting legs 32 may also be extended from a lower ring portion 16 of first and second subassemblies 12, 14. The mounting legs 30 and ancillary mounting legs 32 are configured for insertion into and engagement with the underlying support material. Each of mounting legs 30, 32 may include a stabilizer member 34 extending generally orthogonally therefrom. The stabilizer members 34 are configured for engagement with the underlying support material. The mounting legs 30, ancillary mounting legs 32, and stabilizer members 34 act to retain the trellis 10 in a predetermined position in the underlying support material. In an alternative embodiment, the stabilizer member 34 may be any number of stabilizer members, may extend from the lower ring portion 16, and may extend at an angle relative to the elongate support members 28 or the ring portion, or may be a curved extension. In another alternative embodiment, the trellis 10 may include stakes, guy wires staked to the ground, other support devices or bracing members configured to engage the underlying support material and secure the trellis 10 in a substantially upright position. In a further alternative embodiment, the first or second subassemblies 12, 14 may be used alone to provide a partially surrounded structurally supported growth area for plants, and may include additional support or bracing configured to engage the underlying support material.

The underlying support material may include any suitable material for support of the trellis 10. Example materials include, but are not limited to, soil, sod, mulch, sand, rocks, plastic or mesh sheeting, plastic or foam bases, clay, concrete, plaster, or combinations thereof.

The various components of trellis 10 may be made from any materials suitable for use in connection with a trellis. Example materials include, but are not limited to, metal, wood, bamboo, plastic, fiberglass and composite materials. The suitable materials and/or finishes for the trellis 10 may be configured for outdoor use, and designed to withstand exposure to various temperatures and moisture. In one embodiment, trellis 10 may be made of steel rod, and the steel rod cross sectional diameter is from about ⅛ inch to about ¼ inch. In an alternative embodiment, the trellis 10 may constructed from copper tubing. In an alternative embodiment, the trellis 10 may include portions that are flexible or have elastomeric material. In a further embodiment, the trellis 10 may include light or sound emitting elements.

The components of trellis 10 may be formed using any desired process including, without limitation, molding, machining, spinning, extruding, casting and forging.

The components of trellis 10 may be joined together in any convenient manner such as, without limitation, welding, brazing, adhesive and fasteners.

Lastly, the components of trellis 10 may be finished in any desired manner such as, but not limited to, painting, molded-in colors, plating, or may be left unfinished.

With reference now to FIGS. 1 through 4 together, in use in one embodiment, first and second subassemblies 12, 14 are placed on opposing sides of an object member such as the post 36, with connectors 18 of the first subassembly adjacent the connectors of the second subassembly. The adjacent connectors 18 of the first and second subassemblies 12, 14 may then be coupled together with threaded screws or bolts 24 and threaded nuts 26, thereby joining together the first and second subassemblies with trellis 10 surrounding the post 36. Mounting legs 30, 32 are urged into a supporting material, such as soil, preferably with stabilizer members 34 adjacent to and in contact with or engaging the supporting material. Trellis 10 is maintained in a desired position (such as a generally vertical orientation surrounding post 36) by mounting legs 30, 32 and stabilizer members 34. Trellis 10 installed in this manner may be used to support climbing or unstable plants and vines.

While this invention has been shown and described with respect to a detailed embodiment thereof, it will be understood by those skilled in the art that changes in form and detail thereof may be made without departing from the scope of the claims of the invention.

What is claimed is:

1. A trellis support device, comprising:
   first and second subassemblies,
   each of the first and second subassemblies are formed from metal rods, the first subassembly including a first elongate support member and a plurality of half-circular first ring portions, the second subassembly including a second elongate support member and a plurality of half-circular second ring portions, the first and second ring portions each having interior and exterior perimeters; and
   each of the first ring portions are welded at the interior perimeter to the first elongate support member, each of the second ring portions are welded at the interior perimeter to the second elongate support member, and each of the ring portions including lugs, each of the lugs extending orthogonally from opposing ends of each of the ring portions at the exterior perimeter to enable the first ring portions of the first subassembly to align and connect to the adjacent second ring portions of the second subassembly, to couple together the first and second subassemblies in an opposing facing adjacent manner to form a plurality of circular rings, and
   the first and second subassemblies are configured to engage an underlying support material.

2. The trellis support device of claim 1 wherein each of the lugs includes an aperture through which mounting hardware is used to join together the first and second subassemblies.

3. The trellis support device of claim 2 wherein the mounting hardware includes screws or bolts.

4. The trellis support device of claim 1, wherein one or both of the first and second subassemblies further includes four or more ring portions configured to couple together the first and second subassemblies.

5. The trellis support device of claim 1, wherein the first and second elongate support members are arranged substantially parallel with respect to one another.

6. The trellis support device of claim 1, wherein the plurality of ring portions are substantially parallel with respect to one another.

7. The trellis support device of claim 1, wherein a lower portion of each of the first and second elongate support members is configured as a mounting leg, and the mounting leg is configured to retain the trellis support device in a predetermined position.

8. The trellis support device of claim 7, further including at least one ancillary mounting leg and wherein each mounting leg and the at least one ancillary leg are configured for insertion into and engagement with the underlying support material.

9. The trellis support device of claim 8, further including one or more stabilizer members extending from at least one of the mounting legs and the at least one ancillary mounting leg, the stabilizer members configured for engagement with the underlying support material.

10. The trellis support device of claim 9, wherein the stabilizer members extend generally orthogonally from at least one of the mounting legs and the at least one ancillary mounting leg.

11. The trellis support device of claim 1, further including one or more ancillary mounting legs extending from one of the ring portions of one or both of the first and second subassemblies, and the ancillary mounting legs are configured to retain the trellis support device in a predetermined position.

12. The trellis support device of claim 1, further wherein the trellis support device substantially surrounds an object to provide a structurally supported growth area for unstable or climbing plants.

13. The trellis support device of claim 12, wherein the object is selected from the group consisting of a post, a pole, or a plant stalk.

14. The trellis support device of claim 12, wherein the object is a lamp post.

15. The trellis support device of claim 1, wherein the first and second subassemblies are generally identical or are mirror images of each other.

16. The trellis support device of claim 1, further wherein the ring portions are configured to disconnect the first and second subassemblies for storage.

17. A method for assembling a trellis support device for growing plants, comprising the steps of:
   obtaining a trellis support device including mating first and second subassemblies formed from metal rods, the first subassembly including a first elongate support member and a plurality of half-circular first ring portions, the second subassembly including a second elongate support member and a plurality of half-circular second ring portions, the first and second ring portions each having interior and exterior perimeters;
   welding each of the first ring portions at the interior perimeter to the first elongate support member;
   welding each of the second ring portions at the interior perimeter to the second elongate support member;
   extending lugs orthogonally from opposing ends of each of the ring portions at the exterior perimeter;
   disposing the mating first and second subassemblies on opposing sides of an object;
   aligning and connecting together the lugs of the ring portions of the mating first and second subassemblies in an opposing facing adjacent manner to form a plurality of circular rings to substantially surround the object; and urging the trellis support device into an underlying support material such that the mating first and second subassemblies engage the underlying support material;
wherein the trellis support device provides a structurally supported growth area for the plants.

* * * * *